June 21, 1960 W. C. BENSON 2,941,816
VEHICLE CHASSIS AND AXLE MOUNTING ASSEMBLY
Filed Feb. 2, 1954
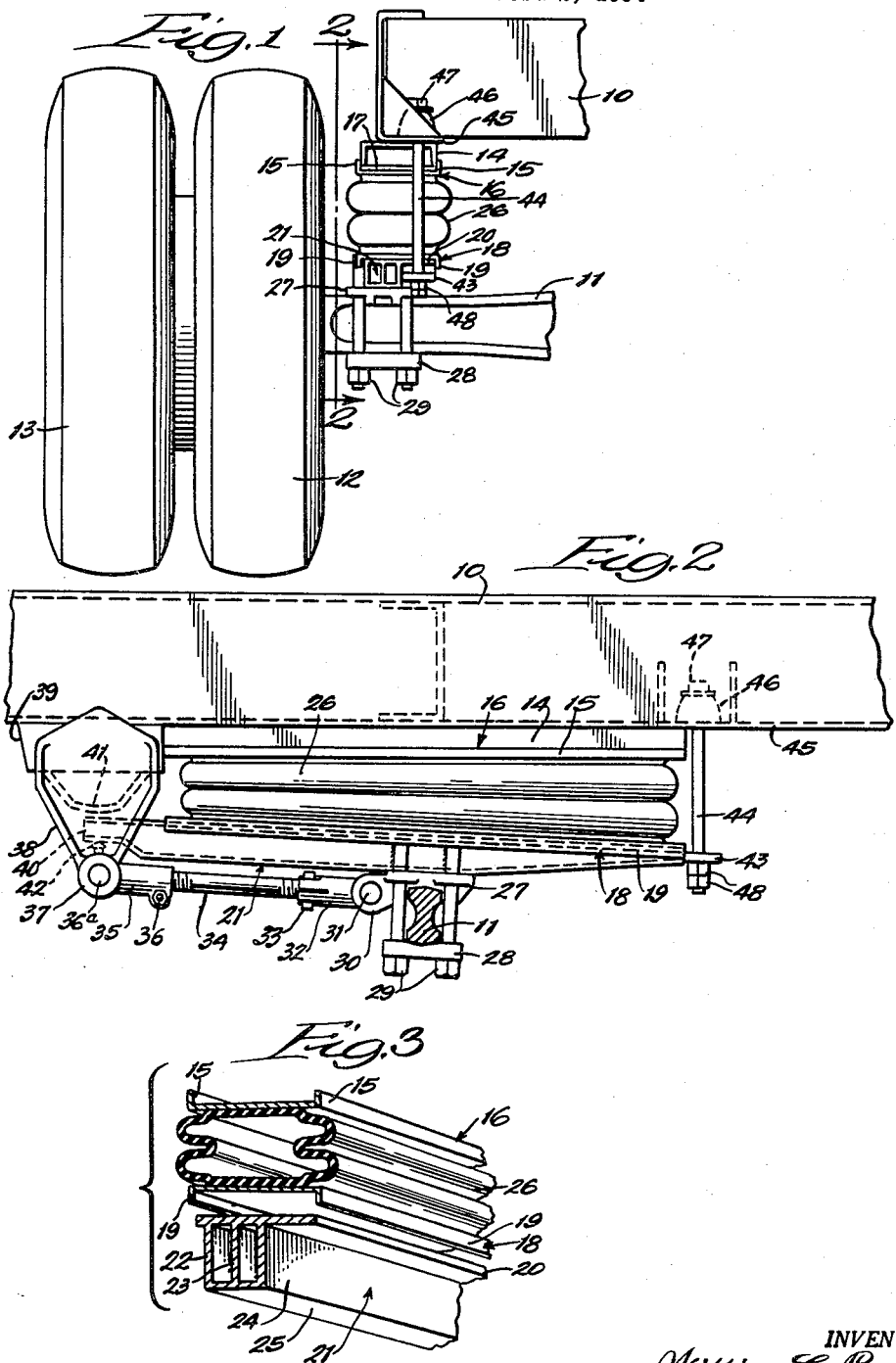
INVENTOR:
William C. Benson,
BY
Dawson, Tilton & Graham,
ATTORNEYS.

United States Patent Office 2,941,816
Patented June 21, 1960

2,941,816
VEHICLE CHASSIS AND AXLE MOUNTING ASSEMBLY

William C. Benson, Augusta, Kans., assignor to Spencer-Safford Loadcraft, Inc., Augusta, Kans., a corporation of Kansas Filed Feb. 2, 1954, Ser. No. 407,703

8 Claims. (Cl. 280—124)

This invention relates to a vehicle running gear, and more particularly to the mounting or coupling of a vehicle chassis and axle, especially of the road vehicle class such as tractor-trailer rigs. It should be appreciated, however, that the invention is applicable to other vehicles.

A problem has long existed, particularly in heavy road vehicles wherein heavy loads are carried and wherein the power of the vehicle engine is fairly great, of translating the starting and braking torque appearing at the vehicle wheels and axle to the body or load carrying chassis of the vehicle. The problem is seriously amplified where coil springs or an air cushion spring is interposed between the vehicle body and axle for in such cases the rigidity naturally provided by leaf springs is not present. Similarly, lateral displacement and sway of the vehicle body relative to the wheels and axle and the elimination thereof has presented serious considerations. Heretofore, no good way has been known to transmit the axle torque to the vehicle body and to restrict lateral movement of the body relative to the vehicle axle. Neither has there been available a sure and easy means for properly aligning a vehicle axle and for maintaining the same in such alignment.

It is accordingly an object of this invention to provide means for overcoming the disadvantages set out above. Another object of the invention is to provide apparatus for transmitting the starting and braking torque appearing at the axle of a vehicle to the load carrying chassis thereof. Still another object is to provide in a vehicle, means for restricting lateral movement of the load carrying body relative to the axle. Yet another object is in providing apparatus functional as a coupling between the chassis and body of a vehicle and which provides quick and accurate alignment of the axle with a minimum of effort and which is thereafter operative to tend to maintain the alignment.

A further object is in the provision of means and apparatus as described above in a vehicle having an air cushion spring or the like interposed between the axle and chassis thereof. Yet a further object is to provide in heavy road vehicles such as tractor-trailer rigs and the like having resilient coil springs, that may be for example of the air and rubber cushion type, a torque bar extending between the axle and chassis of the vehicle and being rigidly secured to one while being constrained for longitudinal movement relative to the other for transmitting axle torque of the vehicle to the chassis thereof; means also being provided for quickly and easily aligning the axle. Additional objects and advantages will appear as the specification proceeds.

An illustrative embodiment of the invention is shown in the accompanying drawing, wherein—

Figure 1 is a broken rear view in elevation of a vehicle embodying the invention; Fig. 2 is a broken side view in elevation of the coupling taken on the line 2—2 of Fig. 1; and Fig. 3 is a broken perspective view showing certain of the parts in spaced-apart relation.

A particularized description of the invention will now be set out with reference to the drawing. It will be noted that in the drawing only a fragmentary view of a vehicle has been presented; that is to say, only a portion of one axle and the wheel assembly thereon and its coupling to the chassis of the vehicle is shown. It should be understood that the opposite end of the axle may be connected to the vehicle chassis by the same coupling means illustrated and which will now be described.

A vehicle chassis or load carrying body portion 10 is illustrated in Fig. 1 and spaced therebelow is an axle 11 equipped at its outer end with a dual wheel assembly comprising the tire and wheel arrangements 12 and 13. The wheel assemblies may be completely conventional, as may the axle 11 and chassis 10. These elements may form a portion of the road vehicle such as the trailer of a tractor-trailer rig. Since such road vehicles are well known, it is believed unnecessary to describe these elements in further detail.

Rigidly secured to the chassis 10 is an inverted U-shaped mounting plate 14, the spaced legs of which are received within the spaced flange portions 15 of an upper saddle member 16. If desired, a reinforcing plate 17 may be placed between the flanges 15 and provides a base upon which the spaced legs of the mounting member 14 may rest. A lower saddle member of generally U shape 18 is provided in spaced relation with the upper saddle 16 and is equipped with depending flanges 19 that receive the upper horizontal plate 20 of a torque bar 21. As is seen best in Fig. 3, the torque bar 21 in addition to having the upper plate 20 has depending walls or ribs 22, 23 and 24 which are rigidly secured to the upper plate 20 and to the base plate 25. Any suitable means for securing the members 20 through 25 together may be employed, such as welding. It will be noted in Fig. 3 that the upper plate 20 overhangs on one side the wall 24 of the torque bar.

Interposed between the upper and lower saddle members 16 and 18 is a spring member 26. Preferably the spring member 26 is an air cushion that is formed, as is seen best in Fig. 3, of a resilient material such as rubber that has an open space through the interior thereof which contains air. Thus the resilient walls of the spring in combination with the air within the interior of the spring member provide a cushion that is operative to soften or cushion the movement of the chassis 10 and axle 11 toward each other. The spring member 26 may be secured to the saddle members in any suitable manner and, for example, may be vulcanized to each of the saddle members. It should be appreciated that the air cushion is somewhat in the nature of a coil spring and has similar characteristics. A coil spring could therefore be used.

As is shown best in Figs. 1 and 2, the axle 11 adjacent the outer end thereof is equipped with a shackle assembly comprising an upper mounting plate 27 and a lower mounting plate 28 that are secured together by the shackle bolts 29 which also extend upwardly above the upper mounting plate 27 and at their upper ends are rigidly secured to the torque bar 21. Thus by this construction the torque bar is rigidly anchored to the axle 11, as is the lower saddle member 18 which is in turn anchored to the upper plate 20 of the torque bar 21.

At its forward end the upper mounting member 27 is equipped with an eye conection providing an opening therein that pivotally receives therein a rod 31 that forms a part of or which is rigidly secured to the coupling 32. The forward end of the coupling 32 is threaded interiorly and has a longitudinally-extending slit and a bolt arrangement 33 that permits the coupling member to be tightened securely about the threaded end of the adjustable radius rod 34. Similarly, the opposite end of the radius rod is threaded and is threadedly received within the threaded end portion of a coupling 35 that similarly has a split end portion and ears extending therefrom that may be tightened together by bolt 36 to clamp the coupling securely about the radius rod. At its forward end the coupling 35 is equipped with a rod or axle 36a that is pivotally received within the opening of the eye member or bearing member 37 provided by a bracket 38 that at its upper end is rigidly secured to a depending flange 39 provided by the chassis 10 of the vehicle.

The bracket 38 provides a seat for the forward end of the torque bar 21 which has a reduced end portion as is indicated at 40 in Fig. 2. The bracket provides a depending upper seat member 41 and a lower pin seat 42 spaced therefrom. The end portion 40 of the elongated torque bar is received between the upper and lower seat members 41 and 42.

At its rear end the torque bar 21 is provided with a laterally-extending ear 43 that has an opening therethrough that receives a bump bar 44 that at its upper end extends through the flange 45 of the chassis 10. A rubber bumper 46 is interposed between the end 47 of the bump bar and the chassis flange 45, and at its lower end the bump bar 44 is threaded and receives thereon nuts 48. The bump bar is of usual construction and is operative to tie the axle assembly and chassis of the vehicle together so that they cannot spread too far apart in response to the action of road bumps, etc.

Operation

In operation of a vehicle equipped with structure embodying my invention, the vehicle functions in substantially the normal manner. A load imposed upon the chassis or body 10 is supported by the wheels 12 and 13 through transfer of the load from the chassis 10 to the spring 26 and axle 11.

It is relatively easy to quickly and precisely align the axle 11 relative to the chassis 10 by simply adjusting the position of the radius rod 34. If a pair of radius rods are provided, each may be adjusted as necessary. For example, if it is desired to move the end portion that is illustrated of the axle 11 forwardly, the radius rod 34 after loosening of the coupling bolts 33 and 36 is rotated so as to draw the coupling members together. On the other hand, if it is desired to push that end portion of the axle rearwardly, the radius rod 34 is simply rotated so as to push the coupling members 32 and 35 farther apart. After the proper alignment is attained, the bolts 33 and 36 are tightened to lock the radius rod in the selected positions within the couplings 32 and 35.

Braking or starting torque appearing at the axle 11 is readily transferred to the vehicle chassis 10 through the torque bar 21. For example, if the brakes are applied rapidly the axle 11 would tend to rotate in a clockwise direction as viewed in Fig. 2 and the end of the torque bar would be brought into engagement with the upper seat member 41, and the braking torque would thereby be transferred to the vehicle chassis through the bracket 38. Similarly, if the vehicle is started the axle 11 would tend to rotate in a counterclockwise direction as viewed in Fig. 2 and in such event the end of the torque bar 21 would be brought into abutment with the lower pin seat 42 and again the torque would be transferred to the chassis 10 through the pin seat and bracket 38.

Lateral shifting of the chassis or load carrying member 10 of the vehicle is also restricted. If, for example, the chassis 10 attempted to shift to the right as viewed in Fig. 1, the bracket 38 would be brought into engagement with the side walls of the torque bar 21 and since this bar is rigidly secured to the axle 11 shifting of the chassis would thereby be restricted.

It has been found that ease in operating a vehicle equipped with my invention is greatly increased, and through the maintenance of proper alignment of the axle 11 with the chassis 10, the restriction of lateral shifting of the chassis, and the almost immediate transfer of starting and braking torque appearing at the axle to the vehicle chassis, that distorting forces are minimized and maintenance of the vehicle simplified.

While in the foregoing specification an embodiment of the invention has been set out in considerable detail for purposes of illustration, it will be apparent to those skilled in the art that considerable change may be made in these details without departing from the spirit and principles of the invention.

I claim:

1. In a structure of the character described, a vehicle equipped with a load carrying chassis and an axle thereunder, a vertically compressible spring interposed between said chassis and axle, a torque bar rigidly secured to said axle and providing the lower support for said spring and having a free end portion, a bracket rigidly secured to said chassis and being equipped with vertically spaced seats, said free end portion being received between said seats for free longitudinal movement but being confined thereby against vertical movement, and a radius rod pivotally secured at one end to said axle and pivotally secured at its other end to said chassis, said radius rod being operative to inhibit relative longitudinal movement between said axle and chassis while uninhibiting vertical movement therebetween and said torque bar being operative to transmit torque from said axle to said chassis while uninhibiting vertical and longitudinal movement therebetween.

2. In a vehicle suspension structure, a vehicle equipped with a chassis and spaced thereunder an axle, a torque bar rigidly secured to said axle and providing an upper support surface, an air cushion interposed between said chassis and axle and being equipped at its lower end with a saddle seated upon said support surface and being constrained against lateral displacement with respect thereto, and a longitudinally adjustable radius rod pivotally connected respectively adjacent each end thereof to said axle and to said chassis, said torque bar being coupled to said chassis for transmitting axle torque thereto while uninhibiting longitudinal movement between the chassis and axle.

3. The structure of claim 2 in which said torque bar is provided with a longitudinally extending free end portion, and in which a bracket member is rigidly secured to said chassis and depends therefrom, said bracket member having vertically spaced seats receiving said free end portion therebetween for longitudinal movement relative thereto but restricting vertical movement of said free end portion relative thereto.

4. The structure of claim 2 in which said support surface is a generally horizontally extending plane, and in which said saddle rides on said plane and is equipped along the longitudinal edges thereof with depending legs that straddle said plane and prevent transverse movement thereof relative to said saddle.

5. The structure of claim 4 in which said torque bar for the most part is relatively narrow and said plane is relatively wide whereupon it provides a support for said cushion throughout its entire area.

6. A road vehicle having a longitudinally extending chassis and positioned in vertically spaced relation therebelow a laterally extending axle equipped with road wheels at the ends thereof for rollingly supporting said vehicle, a pair of longitudinally extending and laterally spaced upper saddle structures respectively carried by said chassis along the bottom thereof in generally horizontal disposition and being located above said axle in downwardly facing, overhanging relation therewith, a pair of longitudinally extending and laterally spaced lower saddle structures respectively carried by said axle along the top thereof and being respectively located below said upper saddle structures in upwardly facing, underlying relation therewith, a pair of longitudinally extending air cushion springs respectively interposed between the associated upper and lower saddle structures and being secured thereto so as to be positively located with respect to both said chassis and axle, each of said air cushion springs being adapted to contain air under pressure defining a support column for resiliently supporting said chassis upon said axle, a pair of laterally spaced bracket structures secured to said chassis and extending downwardly therefrom in longitudinally spaced relation with said axle, and two laterally spaced pairs of longitudinally extending rod structures respectively associated with said bracket structures and each of said pairs comprising two vertically spaced and substantially parallel rods located in generally horizontal disposition and being connected with said axle and coupled with the associated bracket structure, one of said rods in each of said pairs being pivotal with respect to the associated bracket structure for swinging movements in a generally vertical plane defined by the longitudinal axis of such rod and being longitudinally adjustable to selectively change the length thereof and such two adjustable rods being correspondingly located vertically with respect to said axle so that adjustment in the same direction of such two rods enforces movement in a similar direction on each end portion of said axle, the other of said rods in each of said pairs also being pivotal with respect to the associated bracket structure for swinging movements in a generally vertical plane defined by the longitudinal axis of such rod and being substantially ineffective to prevent adjustment of the other of said rods in the pair thereof and movement of the axle resulting therefrom, said rod structures being effective to transmit starting and braking torques from said axle to said chassis while constraining said axle against both longitudinal displacements and rotations about its longitudinal axis but without substantially restricting limited vertical displacements of said axle relative to said chassis.

7. The road vehicle of claim 6 in which said two pairs of rod structures are respectively disposed below said air cushion springs in underlying relation therewith, and in which the couplings of the aforesaid other rods with the respectively associated bracket structures comprises a pair of vertically spaced seats provided by each bracket structure and a free end portion of the associated other rod received between said seats and being movable longitudinally relative thereto but being restricted thereby against substantial vertical movements.

8. In a vehicle suspension structure in combination with a road vehicle having a longitudinally extending chassis and positioned in vertically spaced relation therebelow a laterally extending axle equipped with road wheels at the ends thereof for rollingly supporting said vehicle, a longitudinally extending upper saddle structure carried by said chassis along the bottom thereof in generally horizontal disposition and being located above said axle in downwardly facing, overhanging relation therewith adjacent an end portion thereof, a longitudinally extending lower saddle structure carried by said axle along the top thereof and being located below said upper saddle structure in upwardly facing, underlying relation therewith, a longitudinally extending air cushion spring interposed between said upper and lower saddle structures and being secured thereto so as to be positively located with respect to both said chassis and axle, said air cushion spring being adapted to contain air under pressure defining a support column for resiliently supporting a portion of said chassis upon said axle, a bracket structure secured to said chassis and extending downwardly therefrom in longitudinally spaced relation with said axle, and a longitudinally extending rod structure comprising two vertically spaced rods located in generally horizontal disposition and being connected with said axle and coupled to said chassis, one of said rods being pivotally coupled with said chassis for swinging movements in a generally vertical plane defined by the longitudinal axis of such rod and being longitudinally adjustable to selectively change the length thereof so as to enforce movement of a predetermined character on said axle, the other of said rods being pivotally coupled to said bracket structure for swinging movement with respect thereto in a generally vertical plane defined by the longitudinal axis of such rod and being substantially ineffective to prevent adjustment of the other of said rods and movement of the axle resulting therefrom, said rod structure being effective to transmit starting and braking torques from said axle to said chassis while constraining said axle against both longitudinal displacements and rotations about its longitudinal axis but without substantially restricting limited vertical displacements of said axle relative to said chassis.

References Cited in the file of this patent

UNITED STATES PATENTS

| | | |
|---|---|---|
| 1,427,992 | Williams | Sept. 5, 1922 |
| 1,445,486 | Cats | Feb. 13, 1923 |
| 1,761,135 | LeMoon | June 3, 1930 |
| 2,096,530 | Alden | Oct. 19, 1937 |
| 2,312,253 | Konetsky | Feb. 23, 1943 |
| 2,637,569 | Turner | May 5, 1953 |
| 2,691,420 | Fox | Oct. 12, 1954 |
| 2,713,498 | Brown | July 19, 1955 |
| 2,742,302 | Pointer | Apr. 17, 1956 |
| 2,743,939 | Reid | May 1, 1956 |